United States Patent
Brotz

(10) Patent No.: US 6,422,551 B1
(45) Date of Patent: Jul. 23, 2002

(54) DISPOSABLE CUTTING BOARD

(76) Inventor: Gregory R. Brotz, P.O. Box 1322, Sheboygan, WI (US) 53081

( * ) Notice: Subject to any disclaimer, the term of this patent is extended or adjusted under 35 U.S.C. 154(b) by 0 days.

(21) Appl. No.: 09/802,558

(22) Filed: Mar. 12, 2001

(51) Int. Cl.[7] .................................................. B23Q 3/00
(52) U.S. Cl. .................... 269/289 R; 269/13; 269/302.1
(58) Field of Search ................ 269/13, 302.1, 269/289 R, 15, 303, 315

(56) References Cited

U.S. PATENT DOCUMENTS

| 648,632 | A | * | 5/1900 | Parker | 269/302.1 |
|---|---|---|---|---|---|
| 1,233,184 | A | * | 7/1917 | Chadwick | 269/302.1 |
| 3,837,634 | A | * | 9/1974 | Cobb | 269/302.1 |
| 3,947,012 | A | * | 3/1976 | Cobb | 269/289 R |
| 4,907,789 | A | * | 3/1990 | Tice | 269/289 R |
| 5,984,294 | A | * | 11/1999 | Bogomolny | 269/289 R |

* cited by examiner

Primary Examiner—Joseph J. Hail, III
Assistant Examiner—Daniel Shanley
(74) Attorney, Agent, or Firm—William Nitkin

(57) ABSTRACT

A disposable cutting board is disclosed having a tough plastic upper sheet and a lower base made of papier-mâché. In use, when the upper sheet is pierced, liquid from the food being cut thereon passes through such cuts in the plastic sheet to the base, causing the papier-mâché base to disintegrate and rendering the cutting board unusable. The user is thus encouraged to dispose of the cutting board.

5 Claims, 1 Drawing Sheet

DISPOSABLE CUTTING BOARD

BACKGROUND OF THE INVENTION

1. Field of the Invention

The device of this invention is a disposable cutting board and more particularly a cutting board having a toughened plastic upper sheet and a lower cardboard or papier-mâché base which degrades when the plastic upper sheet has been pierced by cutting, allowing the liquid from food being cut thereon to pass through such cuts to enter and degrade the cardboard base material so that the cutting board base will disintegrate and fall apart, causing the user to have to dispose of the cutting board.

2. History of the Prior Art

Cutting boards are well known in the prior art and have significant problems with the build up of bacteria thereon, especially when the cutting boards have been cut by knives. Such cuts made in cutting boards harbor bacteria. It is hard to thoroughly clean cutting boards whether made of wood or plastic. Due to their cost and apparent sturdiness, cutting boards of the prior art are seldom thrown away or replaced.

SUMMARY OF THE INVENTION

It is an object of this invention to provide a new cutting board which is disposable. The advantage of a disposable cutting board is that bacteria buildup on the cutting board is limited as the cutting board is thrown away after one or limited usage. It is thrown away because of the nature of the action of the elements of the cutting board, which as described below, disintegrate after a short period of use. The structure of this invention is a cutting board of typical dimensions with an upper surface of a toughened plastic sheet, such as a polypropylene sheet which is flat and which is adhered to a papier-mâché base by an adhesive. When the plastic upper sheet is pierced by a knife during cutting of food on the cutting board, the fluid from the food passes through the cut and enters into the papier-mâché base, causing its disintegration and necessitating the disposal of the cutting board before there is a significant bacterial buildup. The cutting board of this invention can be molded with a trough around its perimeter for the collection of fluids as well as to allow retentive stacking thereof for convenient storage and sale thereof, such as in a a stacked pile which can be easily packaged for sale.

DESCRIPTION OF THE PREFERRED EMBODIMENT(S)

Figure 1:
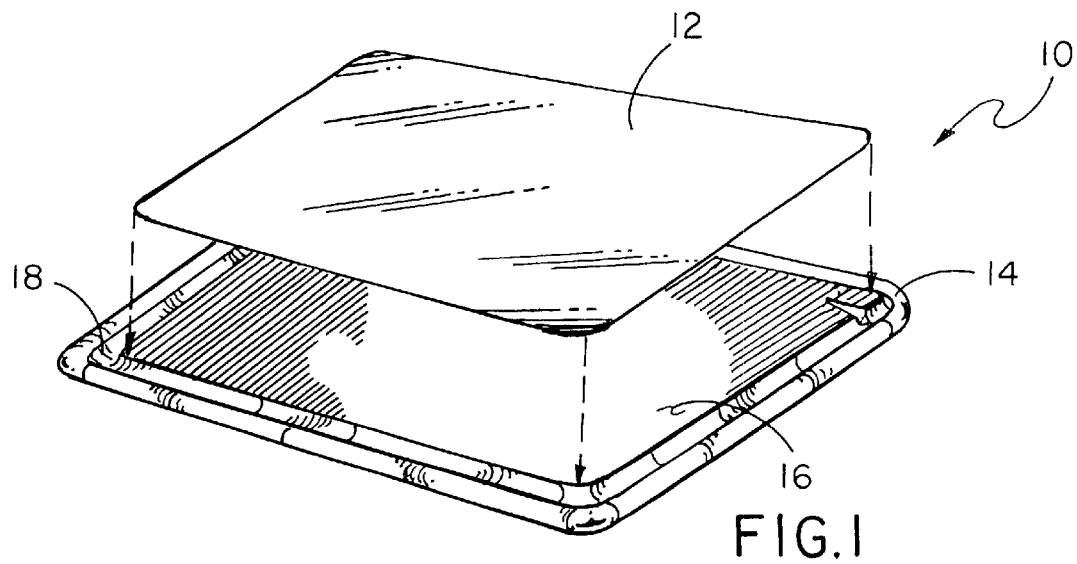
FIG. 1 illustrates a perspective view of the disposable cutting board of this invention with upper surface plastic sheet disposed above the papier-mâché base.
Figure 2:
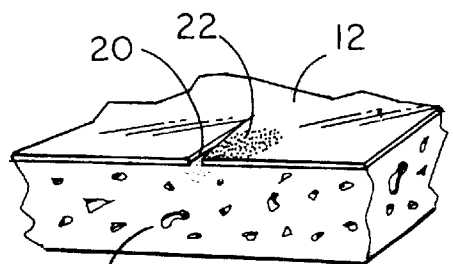
FIG. 2 illustrates a sectional perspective view of the cutting board of this invention in use with a portion shown cut by a knife.

FIG. 1 illustrates the structure of disposable cutting board 10 of this invention which consists of a thin laminate of an upper thin flexible plastic sheet 12 which can be formed of polypropylene or equivalent liquid impermeable material which is adhered to a base 14 of water soluble rigid papier-mâché material by an adhesive which can be water soluble. It should be noted that when the term "papier-mâché" is used to describe the base, it encompasses cardboard and other equivalent materials. In use, as seen in FIG. 2, if a knife cuts through upper sheet 12, cut 20 allows the passage therethrough of fluid 22 from the food being cut, such as blood from meat or other fluids from fruits and vegetables. These fluids enter into the papier-mâché lower base through cut 20, causing the lower sheet to disintegrate and breakdown. As the papier-mâché breaks down, it no longer has sufficient strength to support thin plastic upper sheet 12 so that the user is forced to dispose of disposable cutting board 10 as it no longer retains sufficient stiffness on which to do cutting. In this way the user disposes of the cutting board before there is any significant build up of bacteria thereon. If upper sheet 12 is not cut through, then the cutting board could be cleaned by rinsing and wiping upper sheet 12, but could not be washed in traditional dishwashers or by immersion in water. In use lower base 14 of papier-mâché will also degrade by absorbing fluids from the kitchen counter area even if upper sheet 12 is not cut through. Such limited life of the disposable cutting board of this invention is desirable to avoid bacterial buildup which could be harmful if it contaminates other foods later cut on the cutting board.

Figure 3:
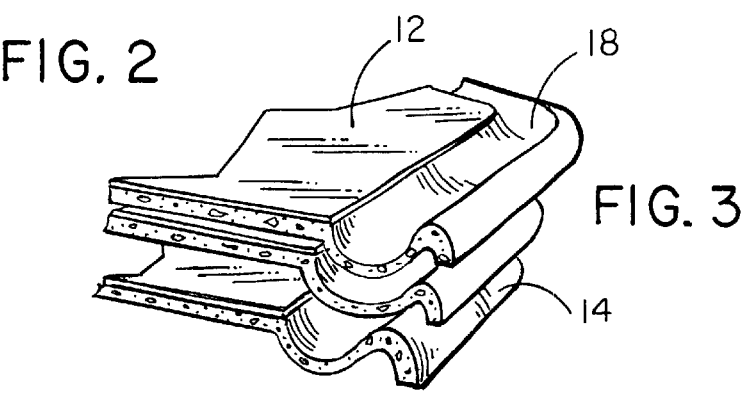
FIG. 3 illustrates a perspective view of a section of a stack of cutting boards of this invention with the troughs thereof interengaged with one another.

In one embodiment of this invention as seen in FIG. 3, base 14 of the cutting board can have a trough 18 molded into its outer perimeter defining an inner sheet receipt area 16, seen in FIG. 1, on which said plastic upper sheet 12 is adhered. Trough 18 allows a plurality of disposable cutting boards to be easily stacked, with the troughs of each interengaged with one another, as seen in FIG. 3.

Although the present invention has been described with reference to particular embodiments, it will be apparent to those skilled in the art that variations and modifications can be substituted therefor without departing from the principles and spirit of the invention.

I claim:

1. A disposable cutting board for the cutting of food which emits fluid during cutting, comprising:

a thin cutable plastic sheet, said plastic sheet receiving cut(s) during said cutting, said fluid emitted from said food passing through said cut(s) in said plastic sheet;

a water-soluble base disposed beneath said plastic sheet; said base dissolved by said emitted fluid passing through said cut(s); and means to adhere said plastic sheet to said base, said cutting board rendered unusable when said base is dissolved by said emitted fluid.

2. A disposable cutting board for the cutting of food which emits fluid during cutting, said cutting board, comprising:

a thin cutable plastic sheet, said plastic sheet receiving cut(s) during said cutting, said fluid emitted from said food passing through said cut(s) in said plastic sheet; and a water-soluble papier-mâché base having a perimeter, said base disposed beneath, and adhered to, said plastic sheet, said base dissolvable during use by said emitted fluid passing through cut(s) made in said plastic sheet during use thereof, rendering said cutting board unusable.

3. The cutting board of claim 2 further including a trough defined along said perimeter, said trough defining an area surrounded by said trough.

4. The cutting board of claim 3 wherein said plastic sheet is disposed within said area surrounded by said trough.

5. A method of using a cutting board for the cutting of food which emits fluid during cutting with a knife, comprising the steps of:

providing a thin plastic sheet;

providing a stiff papier-mâché base;

adhering said plastic sheet to said papier-mâché base to form a cutting board;

supporting said plastic sheet by said stiff base;

cutting through said plastic sheet when cutting said food with a knife;

allowing fluid emitted from said food being cut on said plastic sheet to pass through said cut(s) into said base;

absorbing fluid in said base;

disintegrating said base during usage by the action of said fluid being absorbed;

rendering said cutting board unusable by the disintegration of said base, making said base lose its stiffness and become unable to support said plastic sheet; and disposing of said cutting board.

\* \* \* \* \*